B. S. LOVELAND.
SCRAPING TOOL FORMING MACHINE.
APPLICATION FILED DEC. 7, 1916.
1,363,476. Patented Dec. 28, 1920.
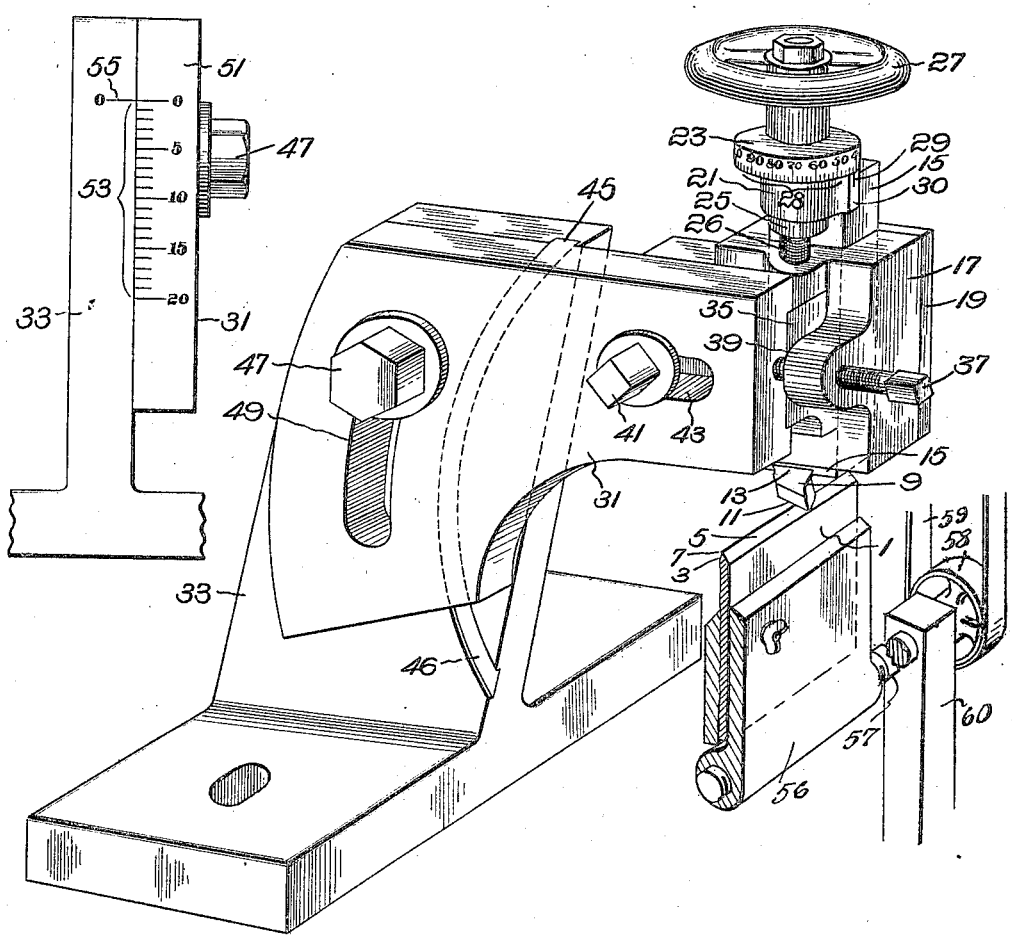
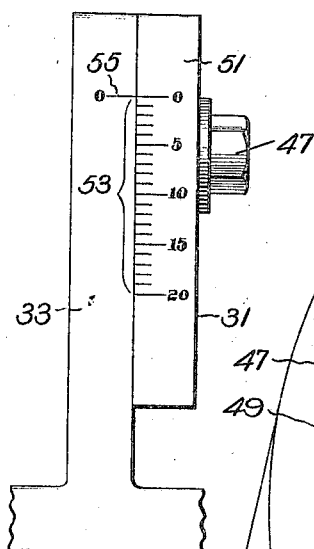
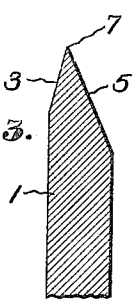
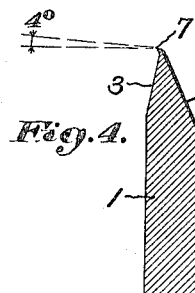
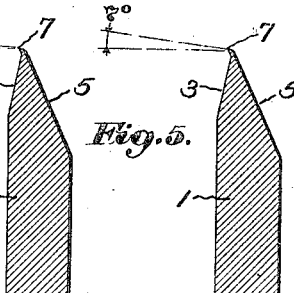
Inventor:
Byron S. Loveland,
by Robt. P. Hains.
Attorney.

UNITED STATES PATENT OFFICE.

BYRON S. LOVELAND, OF WINCHENDON, MASSACHUSETTS, ASSIGNOR, BY MESNE ASSIGNMENTS, TO BAXTER D. WHITNEY & SON, INC., OF WINCHENDON, MASSACHUSETTS, A CORPORATION OF MASSACHUSETTS.

SCRAPING-TOOL-FORMING MACHINE.

1,363,476.   Specification of Letters Patent.   Patented Dec. 28, 1920.

Application filed December 7, 1916. Serial No. 135,636.

*To all whom it may concern:*

Be it known that I, BYRON S. LOVELAND, a citizen of the United States, residing at Winchendon, county of Worcester, and State of Massachusetts, have invented an Improvement in Scraping-Tool-Forming Machines, of which the following description, in connection with the accompanying drawings, is a specification, like characters on the drawings representing like parts.

The invention to be hereinafter described relates to machines for turning or bending over the cutting edges of scraper tools and is an improvement upon the machine shown in Letters Patent, No. 390,931, granted to Baxter D. Whitney, October 9, 1888.

These scraper tools are commonly employed for producing smooth surfaces on veneer and other materials. It is found that in order to efficiently surface woods of varying hardness it is necessary to vary the angle of the turned edge of the scraper tool. For example, the turned edge should have a greater angle to the horizontal when cutting soft wood than in cutting hard wood.

One of the objects of the present invention is to provide a machine which will enable the turning tool to be set quickly and readily to any angle required. Another object is to eliminate the necessity for a number of different turning tools and the necessity for substitution of one for another. And still another object is to provide index means which will enable the turning tool to be accurately adjusted from one angle to another.

The character of the invention may be best understood by reference to the following description of an embodiment thereof shown in the accompanying drawings, wherein:—

Figure 1 is a perspective view of the machine shown herein as embodying the invention;

Fig. 2 is a rear elevation of the support and arm carrying the edge turning tool and showing index means therefor;

Fig. 3 on an enlarged scale, is a transverse section through a scraper tool showing the cutting edge as it appears before being turned over;

Fig. 4 is a similar section of the tool showing the cutting edge turned over to an angle appropriate for scraping a wood of a certain degree of hardness; and Fig. 5 is a view similar to Fig. 4, showing a scraper tool having its cutting edge turned over to an angle appropriate for scraping a wood of a different degree of hardness.

Referring to the drawing:—1 designates a scraping tool which may be held and fed longitudinally by means which is well known in the art, one good practical form of which is shown in Fig. 1, wherein the scraping tool 1 is shown secured to a feed slide or holder 56 mounted in the machine frame for longitudinal movement in the direction of the arrow, Fig. 1, which indicates the line or direction of feed. In the present instance the holder 56 is threaded to a feed screw 57 which may be turned by a pulley 58 driven by a belt 59 from an overhead or other shaft. The feed screw 57 is held from longitudinal movement in its bearing so that rotation of the screw imparts movement to the holder 56 and movement of the scraping tool in the line of feed. The upper edge of the scraper may have suitably ground beveled faces 3 and 5 (Fig. 3) meeting in a cutting edge 7. This edge must be bent or turned over at an angle to the body of the scraper in order that the scraper may be effective in surfacing the veneer or other stock operated on. As stated, this angle varies according to the character of the material to be surfaced. For example, in Fig. 4 the edge is shown turned over to an angle of four degrees to the horizontal, appropriate for surfacing wood of a certain hardness, while in Fig. 5 the edge is shown turned over to an angle of seven degrees to the horizontal, appropriate for surfacing a softer wood.

9 designates the edge turning tool which may be of very hard steel. It has an elongated, rounded active edge 11 extending diagonally of a short shank 13. The active edge 11 of the tool extends transversely and obliquely to the vertical plane of the scraper and also inclines from end to end relatively to the horizontal plane of the edge of the scraper. Thus the turning tool meets said edge inclined in two directions relatively thereto. The inclination of the turning tool from said horizontal plane is less than the inclination of the beveled face 5 of said scraper to said plane. Consequently, when said edge meets said tool and is fed longitudinally, it is turned over by said tool.

With an understanding of the relation of the edge turning tool to the scraper, next will be described means for holding and adjusting said tool. To accomplish this the short shank 13 of said tool is dovetailed and tapered to fit tightly into a similarly shaped transverse groove in the lower end of a vertical bar 15.

This bar is adapted to slide in a groove in a block 17 closed by a cap plate 19. To adjust said bar, it is provided with an ear 21 confined between upper and lower flanges 23 and 25 of a screw 26 threaded into said block and adapted to be turned by a hand wheel 27. The upper flange 23 is somewhat larger than the lower flange and has numbered graduations 28 thereon adapted to be read in connection with an index line 29 on a rib 30 projecting from said ear. Thus, the hand wheel may be turned to adjust the tool toward or from the scraper with a desirable nicety of adjustment.

The block is carried by an arm 31 mounted on a support 33 which may be secured to the usual frame (not shown) on which the scraper holding and feeding means is mounted.

It is desirable to adjust the edge turning tool transversely to the plane of the scraper. To accomplish this, the block 17 may have a horizontal tongue 35 projecting into a groove in said arm. A screw bolt 37 is threaded into an ear 39 of said block and has an end adapted to bear against and react on the end of said arm to adjust said block outward thereon. A screw-bolt 41 entered through an elongated slot 43 in said arm is threaded into said block and serves to secure the latter to said arm in its different positions of adjustment.

Next will be described the means whereby the edge turning tool may be adjusted to vary the angle imparted by said tool to the edge of the scraper. To this end, the arm is provided with an arcuate tongue 45 adapted to slide longitudinally in a similarly shaped groove 46 in a face of said support. In the present instance of the invention, this tongue is struck from a center determined substantially by the point of engagement of the turning tool with the edge of the scraper, but any equivalent means may be employed for appropriately guiding the edge turning tool in an oscillatory adjustment. A screw-bolt 47 entered through an elongated arcuate slot 49 in said arm and threaded into said support, serves to secure the arm to said support in different positions of adjustment.

The rear end 51 of said arm may be curved and provided with suitably numbered graduations 53 (Fig. 2) adapted to be read in connection with an index line 55 on the rear of said support.

Thus, the arm may be quickly and readily adjusted to position the edge turning tool with any desired degree of obliquity with relation to the edge of the scraper.

In operation, the edge turning tool is adjusted to the obliquity required and then the scraper is fed along said tool, thereby turning over the edge of the scraper uniformly and perfectly throughout the length thereof.

It will be understood that the invention is not limited to the particular embodiment shown herein, but that extensive deviations may be made therefrom without departing from the spirit and scope of the claims.

What is claimed is:—

1. The combination with a tool for turning over the cutting edge of a scraper, of a support, a holder for said tool mounted on and adjustable relatively to said support, and arcuate tongue and groove means for guiding said holder on said support.

2. In a machine of the character described, the combination of a support, a scraping tool holder and feeding means therefor, an edge turning tool having a knife edge arranged in a plane extending transversely of and oblique to the vertical longitudinal plane extending along the line of feed movement through the machine, and means for inclining the knife edged turning tool to different positions in a plane passing transversely of the line of feed and about a center passing through the knife edge of the tool.

3. In a machine of the character described, the combination of a support, a scraping tool holder and feeding means therefor, an edge turning tool having a knife edge arranged in a plane extending transversely of and oblique to the vertical longitudinal plane of feed movement through the machine, means for inclining the knife edged tool to different positions in a plane passing transversely of the line of feed and about a center passing through the knife edge of the tool, and means for adjusting the tool to present different portions of the knife edge to the line of feed and cutting edge of a scraper fed through the machine.

4. In a machine of the character described, the combination of a support, a scraping tool holder and feeding means therefor, an edge turning tool having a straight knife edge held in fixed position on said support during operation to turn the cutting edge of a scraper by dragging contact therewith, means for holding the tool with its fixed knife edge extending transversely of and obliquely to the vertical longitudinal plane passing through the line of feed of the machine, and means for tilting the tool in a plane extending transversely of the line of feed that the dragging action of the fixed knife edge may turn the cutting edge of the scraper the desired amount as it is fed through the machine.

5. A machine of the character described, comprising in combination, a support, a scraping tool holding and feeding means therefor, a tool thereon for turning over the cutting edge of a scraper, said tool having an active knife edge adapted to extend transversely of and obliquely to the vertical longitudinal plane of the line of feed through the machine, and means to adjust the tool on said support transversely to said plane to different fixed positions about a center passing through the cutting edge of the scraper to vary the angle of the cutting edge of different scrapers.

6. In a machine of the character described, the combination of a support, a scraping tool holder and feeding means therefor, a tool having a straight edge extending transversely of and oblique to the vertical plane passing through the longitudinal line of feed and cutting edge of a scraper the edge of which is to be turned, means for adjusting the tool bodily transversely of said plane, and means for tilting the tool to different angles in a plane transversely of the line of feed.

7. A machine of the character described, comprising in combination, a tool for turning over the cutting edge of a scraper, a support, a member having an oscillatory adjustment on said support, a member adjustably connected to said oscillatory member, and a member adjustably connected to said last named member and carrying said tool, said members being relatively adjustable to vary the active relation of the tool with respect to the scraper.

8. A machine of the character described, comprising in combination, a tool for turning over the cutting edge of a scraper, a support, a member having an oscillatory adjustment on said support, a member adjustably connected to said oscillatory member, and a member adjustably connected to said last named member and carrying said tool, said members being relatively adjustable to vary the active relation of the tool with respect to the scraper, and index means for indicating the relative adjustment of the oscillatory member on its support.

In testimony whereof, I have signed my name to this specification.

BYRON S. LOVELAND.